United States Patent
Keiser

(10) Patent No.: US 9,420,118 B2
(45) Date of Patent: *Aug. 16, 2016

(54) ADVERTISEMENTS IN CONTROLLED-ENVIRONMENT COMMUNICATION SYSTEMS USING TABLET COMPUTING DEVICES

(71) Applicant: Securus Technologies, Inc., Dallas, TX (US)

(72) Inventor: Luke Keiser, Frisco, TX (US)

(73) Assignee: SECURUS TECHNOLOGIES, INC., Dallas, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/880,530

(22) Filed: Oct. 12, 2015

(65) Prior Publication Data

US 2016/0036994 A1 Feb. 4, 2016

Related U.S. Application Data

(63) Continuation of application No. 14/305,155, filed on Jun. 16, 2014, now Pat. No. 9,160,866.

(51) Int. Cl.
*H04M 15/00* (2006.01)
*H04M 17/00* (2006.01)

(52) U.S. Cl.
CPC .......... *H04M 15/8083* (2013.01); *H04M 15/56* (2013.01); *H04M 17/35* (2013.01); *H04M 2215/0192* (2013.01)

(58) Field of Classification Search
CPC ....... H04N 7/141; H04N 7/147; H04N 7/152; H04M 3/4878; H04M 15/00
USPC ........ 379/114.13, 114.23, 114.24; 348/14.01, 348/14.08
See application file for complete search history.

(56) References Cited

U.S. PATENT DOCUMENTS

| | | | |
|---|---|---|---|
| 6,084,628 A | 7/2000 | Sawyer | |
| 7,292,683 B2 | 11/2007 | Taylor et al. | |
| 7,804,941 B2 | 9/2010 | Keiser et al. | |
| 9,160,866 B1 * | 10/2015 | Keiser | H04M 15/8083 |
| 2003/0198325 A1 | 10/2003 | Bayne | |
| 2010/0299761 A1 | 11/2010 | Shapiro | |
| 2014/0006148 A1 | 1/2014 | Perna | |
| 2014/0267547 A1 | 9/2014 | Torgersrud et al. | |

* cited by examiner

*Primary Examiner* — Quoc D Tran
(74) *Attorney, Agent, or Firm* — Fogarty, L.LC.

(57) ABSTRACT

A tablet computing device and controlled-environment communications processing system implemented process calls for the tablet requesting, via the controlled-environment communications system, a communication link between the tablet and another communications device. A resident of the controlled-environment facility operating the tablet is identified by the tablet to the controlled-environment communications system. The controlled-environment communications system selects advertisement(s) to be played on at least the tablet operated by the resident. The advertisement(s) are played on at least the tablet. The communications link is established by the controlled-environment communications system, between the tablet and the other communications device, before, during or following playing of the advertisement(s) on at least the tablet. Communication is carried out on the tablet, via the communications link, before, during and/or following playing of the advertisement(s).

23 Claims, 4 Drawing Sheets

ADVERTISEMENTS IN CONTROLLED-ENVIRONMENT COMMUNICATION SYSTEMS USING TABLET COMPUTING DEVICES

CROSS-REFERENCE TO RELATED APPLICATION

This is a continuation of U.S. patent application Ser. No. 14/305,155 also entitled Advertisements in Controlled-Environment Communication Systems Using Tablet Computing Devices, filed Jun. 16, 2014, issuing Oct. 13, 2015 as U.S. Pat. No. 9,160,866, and which is incorporated herein by reference.

TECHNICAL FIELD

Embodiments herein are directed, in general, to providing resident communication services in a controlled-environment facility and, more specifically, to methods for providing advertisements before, during or after such communications on tablet computing devices.

BACKGROUND

Telephone service providers typically charge either the caller or a called party for any calls made on the service provider's network. If the caller does not have an established account with the service provider, he or she may be able to pay for the call using a prepaid account or credit card. When the caller does not have a service provider account, a prepaid account, or a credit card, then the caller is usually not allowed to make a call. Any call that is initiated but not completed is lost revenue to the service provider.

This situation may arise in a law enforcement context when an arrestee, prisoner, or other detainee, who is being held in a holding cell, jail, prison or other law enforcement facility, does not have a trustee account, calling account, prepaid account or other means by which to pay for telephone calls. The detainee is then unable to initiate calls, but usually desires to make telephone calls. This results in lost revenue for the law enforcement facility. Depending upon the nature of the law enforcement facility, the detainee may be offered free calls. For example, a recent arrestee may be able to make free telephone calls to try to secure legal representation or bail. These free calls also represent lost revenue to the law enforcement facility and or telecommunication vendor.

SUMMARY

In accordance with embodiments of the present systems and methods, a controlled-environment communication system may include at least one controlled-environment resident operated tablet computing device in use by a resident of the controlled-environment facility within the controlled-environment facility. The system also includes a controlled-environment communication processing system, which in turn has a switch and/or router providing communication connection service between resident operated tablet computing devices and remote communications devices.

An advertisement selection engine of the controlled-environment communication processing system may select, based at least in part upon a relationship of the resident with the controlled-environment facility, one or more advertisements to be played to the resident on the tablet computing device and/or to another party on the remote communications device(s). This relationship of the resident with the controlled-environment facility may be a location in the controlled-environment facility, a term of stay remaining for the resident, and/or the like. Additionally, or alternatively the advertisement selection engine may select one or more advertisements to be played to the resident on the tablet computing device and/or to the other party on the remote communications device based at least in part upon a relationship of the other party to the communication to the controlled-environment facility and/or to the resident. The resident operated tablet computing device may include global positioning system functionality, and when the relationship of the resident with the controlled-environment facility is a location in the controlled-environment facility, it may be determined, at least in part, by information from the global positioning system functionality included in the tablet computing device in use by the resident.

A media server may be a part of controlled-environment communication processing system, used for playing the one or more advertisements. A billing engine of the controlled-environment communication processing system may allow the communication before the one or more advertisements are played, after the one or more advertisements have been played, or while the one or more advertisements are being played. Thereby, in accordance with various embodiments of the present systems and methods, playing the advertisement may, at least partially, fund the communication.

In accordance with such embodiments and other embodiments of the present systems and methods, the communication may be a video call and the one or more advertisements may be video advertisements. The media server may play the one or more video advertisements during the video communication, with the one or more video advertisements appearing in place of at least a portion of the background on a display, such as the display of the tablet computing device in use by the resident.

Thus, in accordance with embodiments of the present systems and methods, a tablet computing device-implemented process may request a communication link between the tablet computing device and another communications device. To this end, the tablet computing device may identify a resident of a controlled-environment facility operating the tablet computing device to a controlled-environment communications processing system. The tablet computing device may play video and/or audio advertisement(s) selected by the controlled-environment communications processing system. In accordance with some embodiments, the tablet computing device may provide global positioning system information for a position of the tablet computing device, such as a specific location within the controlled-environment facility, to the controlled-environment communications processing system for selection of the advertisement(s). Before playing of the advertisement(s), following playing of the advertisement(s), and/or during playing of the advertisement(s), communications may be carried out on the tablet computing device with the other communications device, via the communications link. As noted, the advertisement(s) may be video advertisement(s), and the tablet computing device may display the advertisement(s) in place of at least a portion of a background on a display of the tablet computing device, in accordance with certain embodiments of the present systems and methods. Additionally or alternatively, at least one video and/or audio advertisement may be played on the tablet computing device upon selection of an application program on the tablet computing device by the resident.

Hence, embodiments of a tablet computing device and controlled-environment communications processing system implemented process may, in accordance with the present systems and methods, include requesting, by the tablet computing device, via the controlled-environment communications processing system, a communication link between the tablet computing device and another communications device. A resident of a controlled-environment facility operating the tablet computing device may be identified by the tablet computing device, to the controlled-environment communications processing system.

The controlled-environment communications processing system may select at least one advertisement to be played at least on the tablet computing device operated by the resident. Selection of the advertisement(s) by the controlled-environment communications processing system may be based, at least in part, upon a relationship of the resident with the controlled-environment facility. This relationship of the resident with the controlled-environment facility may be a particular location of the resident within the controlled-environment facility. Thus, in accordance with various embodiments the tablet computing device may share global positioning system information with respect to a specific location of the tablet computing device within the controlled-environment facility with the controlled-environment communications processing system. In accordance with such embodiments, the selection of the advertisement(s) by the by the controlled-environment communications processing system, may be based, at least in part, on the specific location of the tablet computing device within the controlled-environment facility. In embodiments where the relationship of the resident with the controlled-environment facility is a remaining term of stay of the resident in the controlled-environment facility, identification of the resident operating the tablet computing device, by the tablet computing device, to the controlled-environment communications processing system may be used by the controlled-environment communications processing system to determine the remaining term of stay of the resident. Additionally, or alternatively, selection of the advertisement(s) by the controlled-environment communications processing system may be based at least in part upon a relationship of another party to the communication with the controlled-environment facility and/or with the resident.

At least the tablet computing device may play the advertisement(s) selected by the controlled-environment communications processing system. In accordance with embodiments of the present systems and methods, the advertisement(s) may be at least one video advertisement, and the tablet computing device may display the video advertisement(s) in place of at least a portion of a background on the display of the tablet computing device. The communications link may be established by the controlled-environment communications processing system, between the tablet computing device and the other communications device, before, during or following playing of the advertisement(s) on at least the tablet computing device operated by the resident. Communications are carried out on the tablet computing device, via the communications link, before, during and/or after the playing of the at least one advertisement. Further, at least one video and/or audio advertisement may be played on the tablet computing device upon selection of an application program on the tablet computing device by the resident.

BRIEF DESCRIPTION OF THE DRAWINGS

Figure 1:
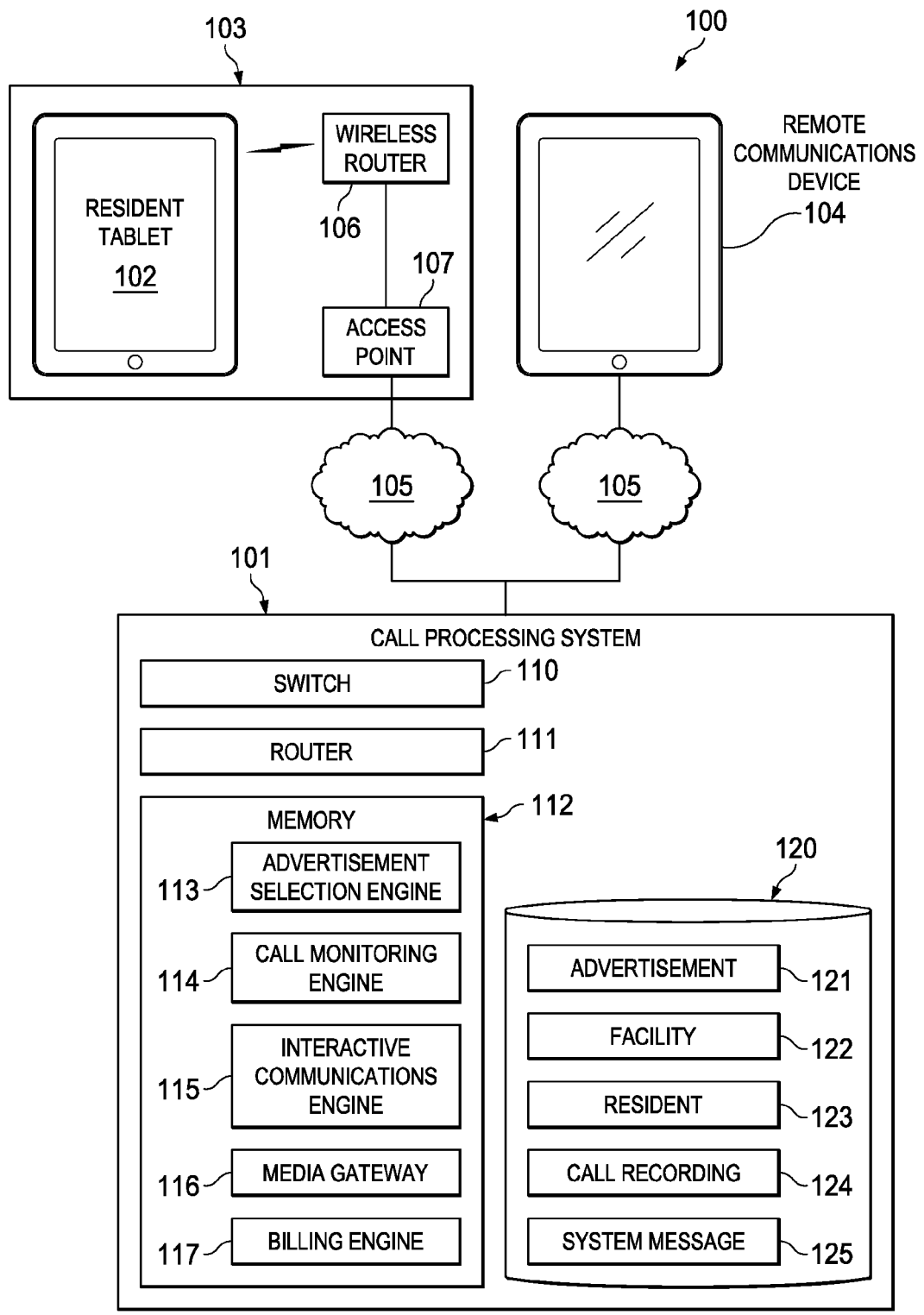
Figure 2:
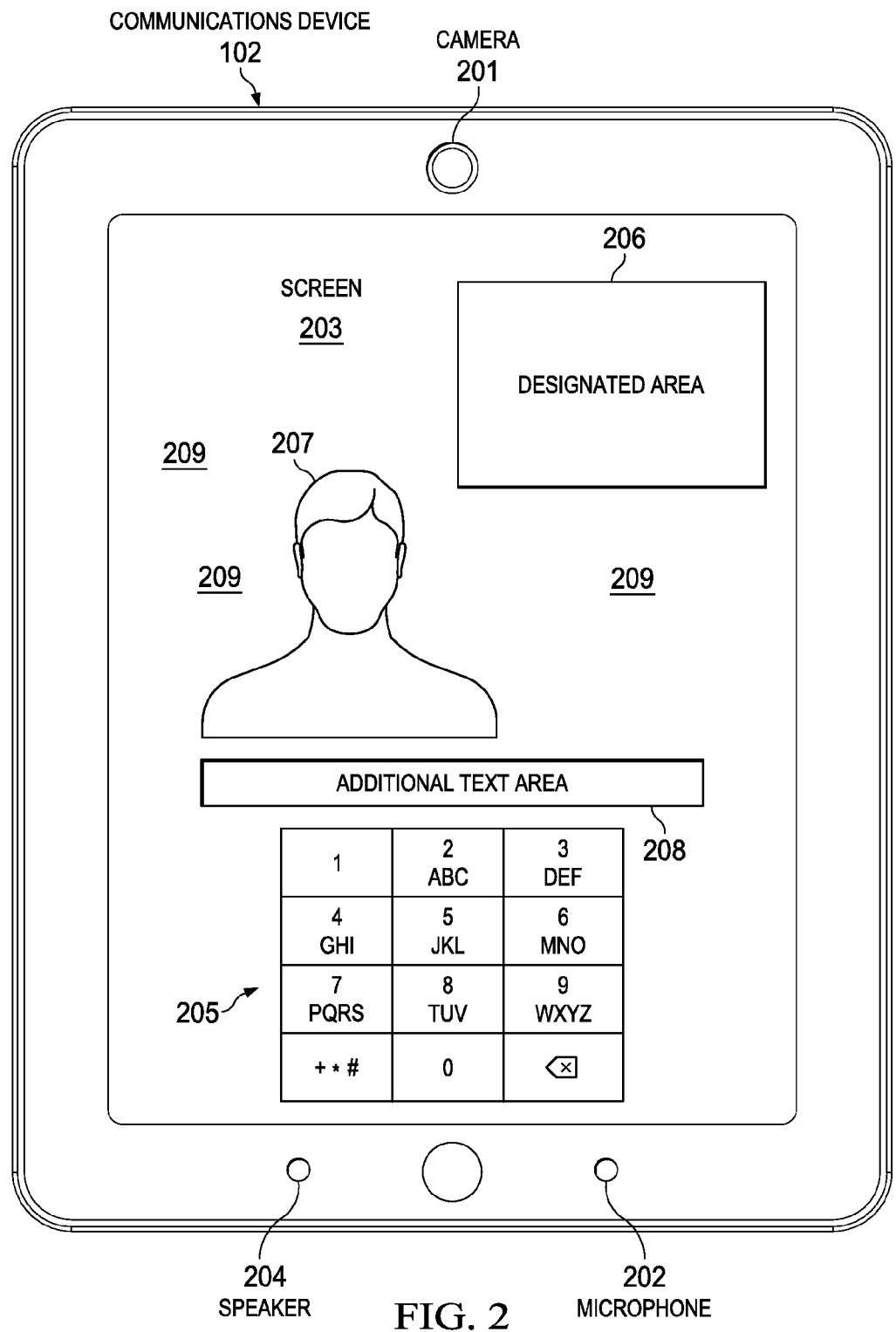
Figure 3:
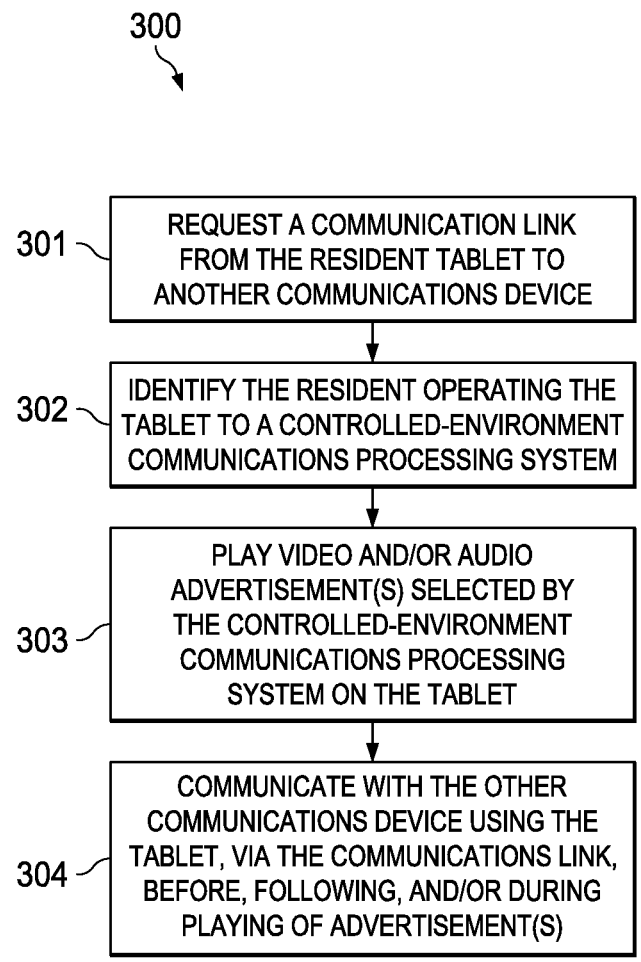
Figure 4:
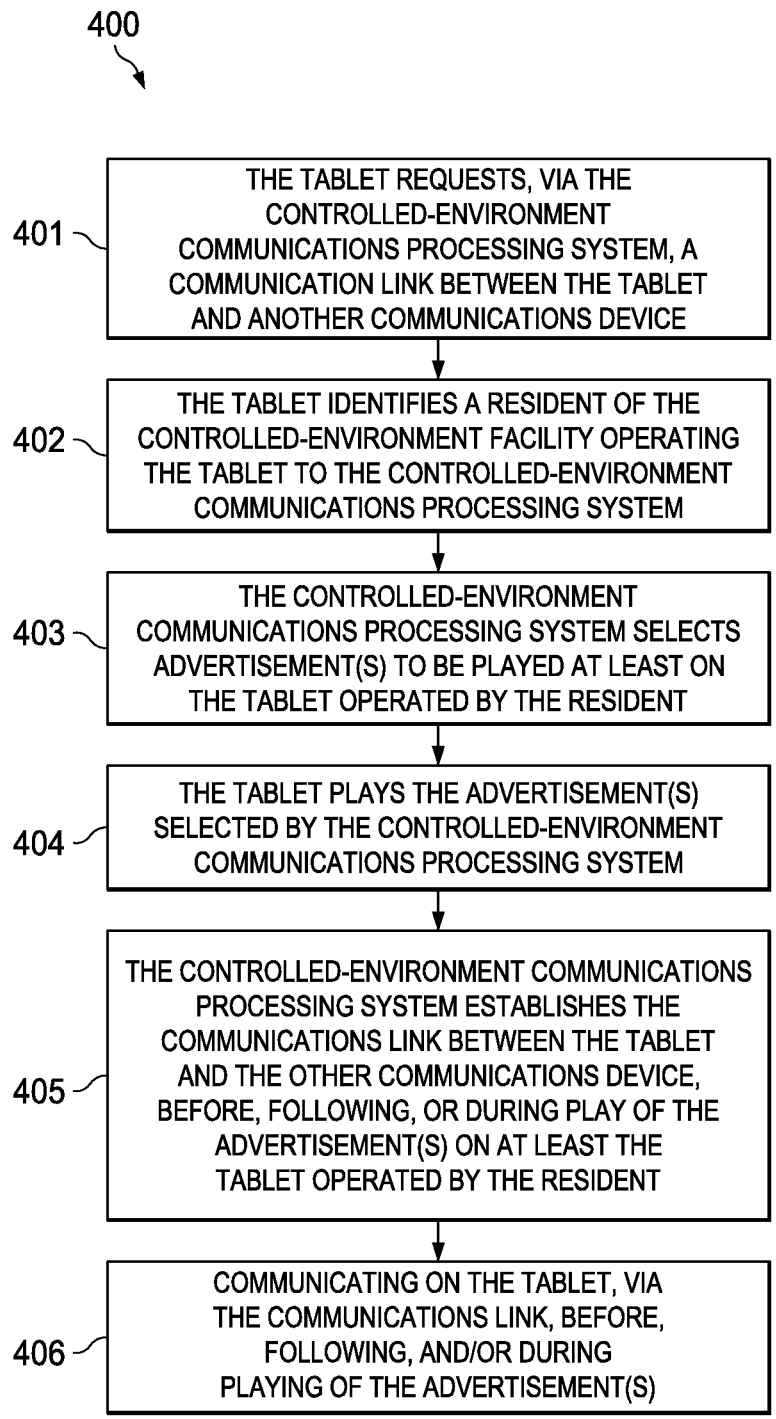

Having thus described the invention in general terms, reference will now be made to the accompanying drawings, which are not necessarily drawn to scale, and wherein:

FIG. 1 is a block diagram of an exemplary embodiment of a telecommunications system adapted to employ embodiments of the present systems and methods;

FIG. 2 illustrates an exemplary tablet computing device for conducting a call, in accordance with various embodiments of the present systems and methods;

FIG. 3 is a flowchart of an example tablet computing device implemented process for advertisement-enable communications in a controlled-environment facility, in accordance with at least one embodiment; and FIG. 4 is a flowchart of an example process implemented by at least a tablet computing device and a controlled-environment communications processing system, according to at least one embodiment.

DETAILED DESCRIPTION

The invention now will be described more fully hereinafter with reference to the accompanying drawings. This invention may, however, be embodied in many different forms and should not be construed as limited to the embodiments set forth herein. Rather, these embodiments are provided so that this disclosure will be thorough and complete, and will fully convey the scope of the invention to those skilled in the art. One skilled in the art may be able to use the various embodiments of the invention.

Although exemplary embodiments described herein may be deployed in a law enforcement environment to provide communication services to residents, those of ordinary skill in the art will understand that the systems and methods described and claimed herein may be used in other facilities and locations to provide communications services to other groups or individuals. For example, an advertisement-funded communication system may be deployed in a hospital or medical facility to allow patients or visitors to make calls. An advertisement-funded communication system may also be provided on a temporary or permanent military base, installation or ship to allow military personnel to make calls. The advertisement-funded communication system would also be useful in other environments in which individuals' movements are restricted or prohibited and in which they may not have funds to pay for communication services.

Additionally, although exemplary embodiments described herein may refer to video and/or voice "calling services," or the like, it will be understood by those of skill in the art that any communication services may be supported by such advertising-funded system. For example, a resident may be required to view or hear an advertisement before or during access is provided to an email application, text application, a video conference system, or the like. The advertisement-funded communication system is not limited to two-person calls, but can also be applied to multi-party communications in which one or more of the parties to the multi-person communication view or hear advertisements.

It will also be understood that the term advertisement as used herein is not intended to be limited to a commercial advertisement prepared on behalf of a business organization, but includes any news, information, message, solicitation, jingle, song, lesson, prayer, public service announcement, educational program, or other information that may or may not be promoting a particular product, service, individual, organization, opinion, or philosophy.

For calls or video communications, which may be funded by advertisers, and/or otherwise, include advertisements, instead of charging the caller or called party, advertising revenue may be used to pay for the communication or reduce the cost of the communication and/or related equipment. For example, in accordance with embodiments of the present systems and methods, the purchase of tablet computing devices used by residents of the controlled-environment facility to place calls may be subsidized by the advertisements, a Wi-Fi network or the like that the calls can be placed over using the aforementioned tablets may be financed by the advertisements, and/or the like.

When a caller attempts to request a communication such as by launching a communication app (application program), Voice over IP (VoIP) app, video communication app, or the like and dialing a number or otherwise indicating a called party, a communication processing system collects identifying information, such as the caller's identification, the called party's telephone number, IP addresses and/or other identifying information. If the collected information is associated with a calling account, then the communication may be connected in a normal manner and the calling account may be charged for the cost of the communication. Alternatively, the advertising system may be utilized even if the collected information is associated with a calling account. If it has been determined that the called party wishes to be connected to the caller through positive call acceptance, and no calling account is available, then the caller is connected before, after or while viewing or listening to an advertisement in order to complete the communication.

If the system determines that the caller will be receiving the advertisement, then the communication processing system selects an advertisement to be played. The advertisement may be selected randomly, or based upon the caller's location, demographics, or other parameters. The advertisement is played for the caller. At the end of the advertisement, the caller may be connected to a called party. The duration of the call connection to the called party may be limited and/or may be dependent upon a number or frequency of advertisements viewed or listened to by the caller. The caller may be offered the opportunity to view or listen to additional advertisements during the communication in order to keep the communication connection active.

The called party may also be offered the opportunity to listen to an advertisement in order to receive an inbound communication from the caller. The caller and the called party may receive the same advertisements or different advertisements. The advertisement for the called party may be selected using the same or different criteria used for selecting caller advertisements.

The advertisement may be presented to the caller and/or called party as an audible message played over the resident's tablet and whatever device the outside party is using for the communication (e.g. another tablet commuting device, a personal computer, telephone, etc.). Alternatively, the advertisement may be a video presentation, such as may be presented on the resident's tablet and on the outside party's device. Hence, if the outside party's device is a telephone, and the advertisement is a video, the outside party may only receive the audio portion of the video advertisement.

In some embodiments, the caller and/or called party on a videoconference may be shown advertisements for the duration of the communication connection. The advertisements may be presented in a designated area of a video display, such as the resident's tablet, or they may be inserted into the video in place of the original background. In this case, the viewing party would see the other party, but the original background behind the other party would be replaced with an advertisement.

FIG. 1 is a block diagram of an exemplary embodiment of a telecommunications system 100 for providing controlled-environment facility resident communications services. Telecommunication system 100 comprises communication processing system 101, which may include, for example, switching or routing equipment to support circuit-switched or packet-based communication connections. Communication processing system 101 may support analog and/or digital communications, such as Plain Old Telephone Service (POTS), Voice over IP (VoIP), video communication, email, or any other communication format. One or more controlled-environment resident tablet(s) 102 are supported by communication processing system 101. In one embodiment, controlled-environment resident tablet(s) 102 is located in controlled-environment facility 103, such as a jail, prison, holding cell, or hospital. Communication processing system 101 provides communication services between controlled-environment resident tablet 102 and one or more remote outside communications device(s) 104, which may be, for example, located at a residence, business, government facility or public facility located separately from controlled-environment facility 103 and/or controlled-environment resident tablet 102.

Communication processing system 101 and controlled-environment resident tablet 102 may be provided by the same service provider. Alternatively, communication processing system 101 may provide communication services to one or more subscribers' controlled-environment resident tablet(s) 102. Communication processing system 101 may be located in controlled-environment facility 103 or located remotely from controlled-environment resident tablet(s) 102. A service provider's controlled-environment resident tablet(s) 102 may be deployed at one or more locations or facilities. Communication processing system 101 may communicate with controlled-environment resident tablet(s) 102 and/or remote outside communications device(s) 104 via any public or private communications network 105, such as a public switched telephone network (PSTN), a packet-based communication network, such as the Internet, a local area network (LAN), a metropolitan area network (MAN), a wide area network (WAN), a cable transmission system, a satellite transmission system, and/or the like, or any other communications network. Direct communication within the controlled-environment facility between system 101 and resident tablet computing device(s) 102 may be over a wireless network, or the like, and/or in certain circumstances via "docking stations," or the like, where resident tablet(s) may be docked and/or connected, such as via a cable, in order to carry out certain functions, for charging, and the like. Wireless router 106 may be connected to communication processing system 101, such as via (network (Internet)) access point 107. In turn, wireless router 106 may provide resident tablet computing device(s) 102 wireless access to communication processing system 101 (such as via access point 107, in the illustrated example).

Outside communications device(s) 104 may be embodied as any communication device and are not limited to tablet computing devices and traditional telephones. For example, outside communications device(s) 104 will be understood to include any communication device, including, without limitation, a tablet computing device, touch-tone or rotary telephone, cellular or mobile telephone, personal digital assistant (PDA), pager, personal or laptop computer running, for example, an email or VoIP software application, and the like. In embodiments of the present systems and methods, outside communications device(s) 104 may be equipped with the capability to facilitate video communications, such as any of the above-mentioned devices, equipped with a video camera. Alternatively, outside communications device(s) 104 may be embodied as a kiosk that supports video communications.

Communication processing system 101 comprises a processor-driven device or devices, such as switch 110 and/or router 111, configured to receive and process telephone calls. To process the telephone calls and provide the services described herein, communication processing system 101 stores data and software programs or modules in a memory 112 that may be logically or physically divided. The data and program modules include, for example, advertisement selection engine 113, communication monitoring engine 114, interactive communication engine 115, media gateway 116, and billing engine 117. Additionally, communication processing system 101 may also comprise or be in communication with one or more databases 120, memories, or data storage devices. For example, communication processing system 101 communicates with or comprises advertisement database 121, controlled-environment facility database 122, resident database 123, recorded communication database 124, and system messages database 125.

Hence, in accordance with embodiments of the present systems and methods, an overall controlled-environment communication arrangement may include at least one controlled-environment resident operated tablet computing device (102) in use by a resident of the controlled-environment facility, within the controlled-environment facility (103). The overall communication scheme may also include a controlled-environment communication processing system (101), which in turn has a switch (110) and/or router (111) providing communication connection service between resident operated tablet computing devices (102) and remote communications devices (104).

In various embodiments, controlled-environment resident tablet 102 is located in a law enforcement facility, such as a prison, jail, or holding cell. In such embodiments, the user of resident tablet 102 is a prisoner, inmate, arrestee, or other resident at the law enforcement facility, may use resident tablet 102 to communicate with family, friends, attorneys, bail bondsmen, or other parties. The law enforcement facility may charge for communication carried out using resident tablet 102 and/or for resident tablet 102 itself. However, a resident may be unable to pay for communication services to use with resident tablet 102 and/or for the tablet computing device itself, particularly if the resident does not have a commissary or trust account established with the law enforcement facility, and/or if the balance in such an account is insufficient. Such accounts may not yet be established if the resident has recently arrived at the facility or is a temporary resident of the facility. In some cases, the controlled-environment facility may desire to provide communications services to residents, and/or even tablet computing devices to some residents, without a charge, but the facility may still need to offset the costs incurred in providing such services and/or devices.

In such cases, communication processing system 101 and controlled-environment resident tablet 102 may allow inmates to communicate with third parties, such as friends and family, attorneys, or others, without charge. Instead of charging an account or called party to cover the cost of a call, communication processing system 101 may use advertising revenue to pay for or reduce the cost of communications using controlled-environment resident tablet 102. For example, the resident and/or the called party may be required to hear or view one or more advertisements before a desired communication will be connected to the called party. After one or more advertisements are played, the desired communication connection is completed and the resident and the called party may communicate.

Communication processing system 101 may limit the duration of each advertising-funded communication for any predetermined duration. The resident may be limited to calls lasting, for example, ninety seconds if the communication was advertiser funded. The resident and/or called party may be required to view, or at least hear, a new advertisement to continue the communication for an additional length of time. In some embodiments, the resident may be allowed to make only one or a limited number of such advertising-funded calls. Alternatively, communication processing system 101 may allow the resident to make as many such calls as desired. Typically, a new advertisement would be played prior to each new communication connection for the resident.

In various embodiments, the resident requests a communication on controlled-environment resident tablet 102 by selecting a communication app or the like on the tablet. Communication processing system 101 detects the communication attempt and either plays one or more advertisements to the resident before initiating the requested communication connection, or requests the communication connection to the called party before playing advertising messages. If both the resident and the called party are connected to the communication processing system 101, direct communication between them may be withheld until the advertisements are played on resident tablet 102, remote communications device 104, or both.

Communication processing system 101 identifies the resident and called party. The identification may be based, for example, on the resident's location, a resident identifier, the called party's telephone number, or an identifier for controlled-environment resident tablet 102. Controlled-environment facility database 122 stores, for example, the number, location and other pertinent information associated with each controlled-environment phone in the system. Controlled-environment facility database 122 may include information indicating which residents are allowed to use the advertisement-funded calls and/or which resident tablets can be used to make advertisement-funded calls. Facility database 122 may also include information related to locating resident tablet(s) 102 within controlled-environment facility 103, such as GPS coordinates, spatial coordinates, or the like associated with various locations within the facility, such that an inquiry of GPS functionality in a resident's tablet, can render a location of the resident within the facility. Communication processing system 101 uses advertisement selection engine 113 to determine which advertisements to play. Based upon the resident and/or called party's identification, or based upon any other criteria, including random selection, advertisement selection engine 113 selects an advertisement from advertisement database 121, which stores audio and/or video advertising messages and characteristics. Advertisement database 121 may further store data associated with each advertising message, such as an advertisement duration, an intended audience, a required or maximum number of plays, and a counter of how many times each advertising message is played.

In particular embodiments, advertisement selection engine 113 of controlled-environment communication processing system 101 may select, based at least in part upon a relationship of the resident with controlled-environment facility 103, one or more advertisements to be played to the resident on tablet computing device 102 and/or to another party on remote communications device(s) 104. This relationship of the resident with controlled-environment facility 103 may be a location in the controlled-environment facility, a term of stay remaining for the resident, and/or the like. Resident operated tablet computing device 102 may include global positioning system functionality, and when the relationship of the resident with the controlled-environment facility is a location in the controlled-environment facility, it may be determined, at least in part, by information from the global positioning system functionality included in the tablet in use by the resident. Additionally, or alternatively advertisement selection engine 113 may select one or more advertisements to be played to the resident on tablet computing device 102 and/or to the other party on remote communications device 104 based at least in part upon a relationship of the other party to the communication to the controlled-environment facility and/or to the resident, such as the other party's location, distance from the facility, other friends or family in the facility, visitation status with the facility, and/or the like.

Communication processing system 101 may use communication engine 115, or the like, to interact with the resident and/or called party by playing system messages and recognizing the resident and/or called party's responses. For example, upon detection that a new communication has been requested, communication engine 115 may select a welcome or introduction message from system message database 125. The communication engine 115 plays the welcome message to the resident and/or called party to notify them that an advertisement must be played before the communication connection will be completed. Communications engine 115 may also be used to play or provide the selected advertisements to the resident and called party. In certain embodiments, the communication engine 115 may be replaced by an interactive voice response (IVR) engine, Voice Response Unit (VRU) engine, or another similar system, and/or may be associated with, employ and/or be apart of media gateway 116. As discussed, the advertisement may be played during the communication between the parties. Background audio, such as a message, song or jingle, may be played while the caller and called party are talking. After selecting an advertisement, communication processing system 101 may connect the interactive communication engine 115 into an established communication connection between the parties effectively creating a three-way communication. The interactive communication engine 115 plays the selected advertisement for all or part of the communication connection duration.

In accordance with various embodiments of the present systems and methods, media server/gateway 116 may be used for playing the one or more advertisements. Billing engine 117 may allow the communication before the advertisements have been played, after the advertisement(s) have been played, and/or while advertisement(s) are being played. In accordance with such embodiments and other embodiments of the present systems and methods, the communication may be a video communication and the advertisement(s) may be video advertisement(s). As noted, media server/gateway 116 may play the video advertisement(s) during the video communication, with the video advertisement(s) appearing in place of at least a portion of the background on a display, such as the display of tablet computing device 102 in use by the resident.

Before, or after the advertisement is played and/or while advertisement(s) are playing, communication processing system 101 completes a communication connection between the resident and called party. Hence, in accordance with various embodiments of the present systems and methods, playing the advertisement may at least partially funds the communication. Communication processing system 101 may allow the communication connection to continue for a predetermined duration, or for any duration. The predetermined duration may be selected based upon the particular advertisement played or the number of advertisements played or based upon criteria of the resident or called party. Alternatively, all advertisement-funded communication connections may be limited to the same duration.

Communication processing system 101 may use communication monitoring engine 114 to record some or all calls. Communication recordings and communication-related data may be stored to recorded communication database 124. Communication monitoring engine 114 monitors calls for improper content, such as gang signs, pornography, sexual content, and criminal activity, and/or may monitor calls for feedback on advertisements.

In accordance with various embodiments, once improper content is detected, communication monitoring engine 114 notifies communication processing system 101, which may disconnect the communication, and/or alert a monitoring agent or authority. When the communication is disconnected, communication processing system 101 may use interactive communication engine 115 to inform the inmate of the content violation. Communication processing system 101 may also document revocation of the resident's privileges by recording the violation in the resident's record or file in resident database 123. For example, an inmate may be advised of a system's flexible one-strike rule on improper content when the inmate is provided with the inmate's identification number and PIN. By using the system, the inmate agrees to the monitoring and also to comply with the content restrictions. When the inmate violates the one-strike rule, the system is flexible in how the inmate's access to the system will be limited. For example, the first violation may result in a warning from the interactive communication engine 115, a one-day suspension from use of the telecommunication system, or a complete revocation of telecommunication privileges. While the system is flexible in how the inmate is disciplined for violations of the improper content rule, the system strictly enforces the improper content rule. In some embodiments, the communication monitoring engine 114 will also send the suspected communication to prison officials for review. Upon review, the prison official may reinstate the inmate's privileges by overwriting the violation in the resident database 123. Resident database 123 stores resident files, such as identification information for each inmate, assigned PIN, phone privileges, criminal record, and other similar information.

As noted, in accordance with various embodiments, a communication monitoring engine 114 may capture communication content for a time period following playing of the advertisement(s). Also, interactive communication engine 115, or the like may pose one or more questions, such as via resident tablet 102 or remote communications device 104, during recording of the communication to record responses or reactions to the one or more questions. In accordance with such embodiments, interactive communication engine 115, or the like may also present a means, via resident tablet 102 and/or remote communications device 104, to connect to an advertiser of the advertisement. Recorded communication database 124, or the like may store the captured communication content from the time period following playing of the advertisement, and the captured communication content stored on the recorded communication database may be associated with a respective advertisement, therein. An advertisement feedback aggregation and analysis engine, or the like may aggregate the communication content from a time period following playing of the advertisement from a plurality of calls and/or analyze the communication content. One or more advertiser databases, or the like may (also) store captured communication content, which is being provided to an advertiser. Thereafter, advertisement selection engine 113 may apply feedback analysis resulting from analyzing the communication content from the time periods following playing of each advertisement to future selection of advertisements.

In accordance with embodiments of the present systems and methods, pop-up advertisements may appear on a resident's tablet before calls or videos and/or when various apps are accessed. In some embodiments the advertisements may additionally or alternatively appear during the video or audio communication itself. As a further example, such advertisements appearing during a communication may, in various embodiments, be played in the background during a video communication. FIG. 2 illustrates a block diagram of an exemplary tablet computing device 102, which may be used for conducting a video communication while displaying advertisements to the caller or called party. As noted, advertisements may be used in conjunction with such calls to help defray not only communication costs, but also the cost of resident tablet computing devices, themselves. Although described from the perspective of the caller, device 102, or the like would operate in a similar manner for the other call party or any other party to a multi-party communication.

Tablet computing device 102 may be particularly adapted for use in a controlled-environment. For example, in a correctional institution, jail, or the like, such a tablet computing device may be "stripped-down," particularly from the standpoint of what applications are provided or allowed on tablet computing device 102, and/or connectivity afforded such a tablet computing device. For example, such a resident tablet computing device may be adapted to only connect to a network provided by the controlled-environment facility, and/or in only certain locations, within the controlled-environment facility, such as may be controlled by availability of Wi-Fi access, or the like, only being available in certain areas. Also, the resident tablet may have a few fixed application programs (apps) pre-installed on the device, and installation of further apps on the device may be forbidden (i.e. prevented by modifications to the device's operating system, or the like) and/or restricted, such as by requiring permission from a facility administrator, or the like.

Apps provided on such a resident tablet computing device might include a communication app, which might be used to request and/or carry out audio (i.e. VoIP) calls, and/or video calls. A further app, such as a commercially available video communications or VoIP app may be used in conjunction with the communications app, with the communications app providing an interface with the controlled-environment's communication processing systems, such as system 101 discussed above, to provide information related to the communication, such as the identity of the resident, and the like, and with the facility's communication processing system vetting the communication before it is connected and carried out using the commercially available communications app. In accordance with embodiments of the present systems and methods, advertisements may be presented to the resident, and/or the other call party, before the communication is handed-off to the commercially available communications app. Thereby, such advertisements may be used in conjunction with such calls to help defray not only communications costs, but also in accordance with some embodiments, the cost of resident tablets, themselves.

In video calls, camera 201 may capture moving or still video images of the caller and microphone 202 captures audio from the caller. The images and audio are transmitted to the other call party. The other call party may use a similar device that transmits images and audio from the called party to the caller, such as another tablet computing device, smartphone, video enabled personal computer, or the like. Received images of the other call party are displayed on screen 203 and called party audio is played through speaker 204. The caller can enter dialed digits or other information to the communication processing system, communications app, and/or the like, via user interface 205.

A communication connection between the parties may be established as described above. Either or both of the parties may be asked to receive an advertisement in order for the video communication to continue. As noted above, such an advertisement(s) may be played before the communication commences and/or after the communication ends. However, in accordance with embodiments of the present systems and methods, instead of playing the advertisement before completing the communication connection, the parties may be connected and one or more advertisements may be broadcast to either or both parties during all or part of the communication. Advertising images, such as logos, video, still pictures, or graphics, may be displayed in a designated image area 206. For example, the image of the other call party 207 may be offset up/down or left/right on display 203 to make room for image area 206. Image area 206 may include text, in accordance with embodiments of the present systems and methods.

An additional or alternative text area 208 may be displayed on screen 203. Text area 208 may be a scrolling or still text message containing the selected advertisement. In some embodiments, both image area 206 and text area 208 are displayed during a communication. Each area may display advertisements that are related, unrelated, coordinated, or uncoordinated, such that the advertisements in image area 206 and text area 208 may be part of the same advertising campaign or from different campaigns. More than one image area and text area may be used simultaneously during the communication. The location of the image area and text area may also change during the communication or from communication to communication. The advertiser may select how and where the advertisement should be displayed, or how the advertisement should move during a communication. If the advertisement is moving, such as an image area 206 that moves or slides around the screen, then the viewing party may be more likely to notice and watch the advertisement. A video processing engine, which may be a part of media gateway 116 (FIG. 1), in communication processing system 101 may be used to add image area 206 and text area 208 to the displayed video (as well as to facilitate the video communication, as discussed above).

In some embodiments, screen 203 may display an image 207 of the opposite party, but the remainder of the screen area 209 may be used for an advertisement. This would allow the advertisement to be played in the background 209 of the opposite party 207. Chroma key compositing or chroma keying may be used to insert advertisements in the image behind the opposite party. The opposite party may be placed in front of a greenscreen or bluescreen. During the communication, the green or blue color is replaced in the video image with an advertisement by media gateway 116's video processing engine. Alternatively, the other call party is not located in front of a special background, but media gateways 116's video processing engine analyzes the video image from the other call party and identifies the portion of the image that corresponds to the other call party, such as by observing movement of the other call party and lack of movement of the background during the communication. The video processing system may treat any video that is not part of the other call party image as background and may insert advertisements by replacing the background area.

In various embodiments, tablet computing device 102 may be used for visitation in a law enforcement environment. Hence, one party, as discussed, may be a resident in a restricted access facility, such as a prison, and the other party a friend, family member, bail bondman or attorney at some location separated from the resident. The resident or the other party may schedule a video visitation session. The resident could participate in the communication using tablet computing device 102 at the facility, and the other party would use a similar device in a separate area of the facility, or at a location remote from the facility. Alternatively, the other person may use a personal or laptop computer with a web camera, or the like to participate in the communication. The video connection between the parties may be established and supported by an organization, organizations or commercial service that provides computer services and software for use in telecommunications industry.

Further apps provided on resident tablets might include apps of particular interest to residents of the controlled-environment facility. For example, tablet computing devices provided to inmates of correctional facilities, might include apps that may be of particular use to an inmate, in general, such as access to a legal research service, or of more specific interest, such as providing an inmate nearing release, access to employment searching apps or the like.

Advertisements, such as advertisements by bail bondsmen, lawyers, facility commissary, and/or the like, might not only be presented during inmate calls on a tablet computing device, but also during other use, including general use, listening to music, accessing permitted websites, and the like. As with calls, income from such advertisements may be used to help defray not only communications costs, but also in accordance with some embodiments, the cost of resident tablet computing devices, themselves. These advertisements may be related to the subject matter of an accessed app. For example, when an inmate accesses a job app on his or her tablet, an advertisement related to employment may pop-up, such as an advertisement related to a document services company, an affordable used car dealership, or such.

Further, such inmate tablet computing devices may be used to help soon to be released inmates transition. For example, the tablet may be used to communicate with a future employer, or the like. As such, tablets may be sponsored, or otherwise subsidized by organizations or companies, assisting with the transition of inmates into society.

In accordance with certain embodiments of the present systems and methods, in a correctional facility environment, a tablet may be provided to an inmate, more-or-less free of charge, by an entity such as a facility services provider. Such embodiments may be practical if it seems the inmate will make use of the tablet for sometime, and the inmate would seem to be able to pre-pay for services related to the tablet, such as communications services, Internet access, music subscription services, legal research services, employment search services, and/or the like. For example, the inmate may pay a flat monthly fee, such as from a trust account maintained by the facility for the benefit of the inmate, for access to a number of services over the tablet, and the tablet may be provided free of charge, but advertisements may appear on the tablet when in use, not only in use for communications, but also in use of other apps, to help defray costs of the tablet (and/or services).

FIG. 3 is a flowchart of example tablet computing device implemented process 300 for advertisement-enable communications in a controlled-environment facility, in accordance with at least one embodiment. Therein, a communication link is requested between the tablet computing device (102) and another communications device (104) at 301. To this end, the tablet computing device (102) may, at 302, identify a resident of a controlled-environment facility operating the tablet to a controlled-environment communications processing system (101). At 303, the tablet computing device may play video and/or audio advertisement(s) selected by the controlled-environment communications processing system. In accordance with some embodiments, the tablet may provide global positioning system information for a position of the tablet, such as a specific location within the controlled-environment facility, to the controlled-environment communications processing system for selection of the advertisement(s). Before, following, and/or during playing of the advertisement(s), communications may be carried out at 304 on the tablet computing device with the other communications device, via the communications link. As noted, the advertisement(s) may be video advertisement(s), and the tablet may display the advertisement(s) in place of at least a portion of a background on a display of the tablet computing device, in accordance with certain embodiments of the present systems and methods.

FIG. 4 is a flowchart of example process 400 implemented by at least a tablet computing device (102) and a controlled-environment communications processing system (101), according to at least one embodiment. Process 400 may, in accordance with the present systems and methods, include requesting at 401, by the tablet computing device (102), via the controlled-environment communications processing system (101), a communication link between the tablet computing device and another communications device (104). A resident of a controlled-environment facility operating the tablet may be identified by the tablet, to the controlled-environment communications processing system at 402. A resident may input, on the tablet, an identification number and identification verifier, such as a PIN, radio frequency identification (RFID), biometric identifier, or other similar means of verifying the inmate's identity. Alternatively, the communication processing system may identify the caller by the particular tablet computing device used. The caller's identification may be used to select advertisements to be played or whether the caller is authorized to place the communication, such as by using the inmate's identification number and/or identification verifier to check the inmate's privileges in a resident database (123).

Further, the communication processing system may determine whether the caller and/or the other call party meet the criteria for an advertisement-funded communication. If the caller is approved to make calls using the advertising-funded communication system, then the communication may be at least partially funded by advertisement(s), in accordance with embodiments of the present systems and methods. For example, in some embodiments, when the communication processing system detects a communication link is requested between a first party and a second party, instead of determining whether a billing account applies to the communication, the communication processing system applies a set of advertising rules to the first party and/or second party. The communication processing system determines, based on the advertising rules, whether to play one or more advertisements to the first party and/or the second party. An advertisement selection engine (113) and/or billing engine (117) may apply the advertising rules, for example. The communication processing system then connects the communication link between the parties after playing advertisements to the selected parties.

A message may be played to the caller and/or the other call party, wherein the message may inform them that they must listen to or watch an advertisement before the communication will be completed. The message may identify any communication limitations, such as communication duration limits, or provide warnings, such as a communication-monitoring or communication-recording notice. Messages may be played to the caller and called party using an interactive communication system (115), for example.

At 403, the controlled-environment communications processing system may select at least one advertisement to be played at least on the tablet computing device operated by the resident. The system selects an advertisement to play to the caller and/or called party using, for example, an advertisement selection engine (113). The advertisement selection engine may select the advertisement from an advertisement database. This may be a random selection, or some pre-defined selection criteria may be employed. The pre-defined selection criteria may compare the caller or called party identity, location or other characteristics to select advertisements. The system may compare characteristics associated with each advertisement and stored in the advertisement database with characteristics of the caller and called party to select which advertisement to broadcast. As an example, the advertiser may indicate certain key characteristics of the advertisement, such as business type, geographic location, or intended audience. These characteristics may be used as a filter for the advertisement selection engine. The advertisement selection engine uses information associated with the other call party's number, the caller identification number, and the controlled-environment phone location in selecting which advertisement message to play. In certain embodiments, the advertisements may also be categorized based on the advertiser's payment level. Advertisers pay a fixed fee to attain certain advertisement levels, which would guarantee that the advertisement plays a certain number of times. In some embodiments, the advertisers may pay for the advertisement based on the time of day that the system plays the advertisement. The advertisement database or advertisement selection engine may track the number of times each advertisement is played. In such embodiments, the advertisement selection engine may be responsible for ensuring that each advertisement using this payment plan is played the correct number of times or at the proper time of day.

In accordance with various embodiments, selection of the advertisement(s) at 403 by the controlled-environment communications processing system may be based, at least in part, on upon a relationship of the resident with the controlled-environment facility. This relationship of the resident with the controlled-environment facility may be a particular location of the resident within the controlled-environment facility. Thus, in accordance with various embodiments the tablet may share global positioning system information with respect to a specific location of the tablet within the controlled-environment facility with the controlled-environment communications processing system. In accordance with such embodiments, the selection of the advertisement(s) by the controlled-environment communications processing system, may be based, at least in part, on the specific location of the tablet within the controlled-environment facility. For example, if the communication originates from a jail booking area, the system will search for advertisements for attorneys, bail bondsmen, and similar services in the local area.

In embodiments where the relationship of the resident with the controlled-environment facility is a remaining term of stay of the resident in the controlled-environment facility, identification of the resident operating the tablet computing device, by the tablet, to the controlled-environment communications processing system at 402 may be used by the controlled-environment communications processing system to determine the remaining term of stay of the resident.

Additionally, or alternatively, selection of the advertisement(s) by the controlled-environment communications processing system may be based at least in part upon a relationship of another party to the communication with the controlled-environment facility and/or with the resident. For example, the relationship between the parties may be used to select advertisements. By way of further example, if the caller calls from one city to a called party in a distant city, the system may search for local or national advertisements for consumer goods, calling cards, or other products and services that either the caller or the other call party could purchase. The caller and called party may hear or view the same advertisement or different advertisements, in accordance with various embodiments of the present systems and methods.

At 404, at least the resident tablet computing device (102) may play the advertisement(s) selected by the controlled-environment communications processing system (101). In accordance with embodiments of the present systems and methods, the advertisement(s) may be at least one video advertisement, and the tablet may display the video advertisement(s) in place of at least a portion of a background on the display of the tablet computing device. In accordance with some embodiments of the present systems and methods, the communication processing system may or may not play advertisements to the other call party. In some embodiments, the system connects to the other call party and notifies them that to receive an incoming communication, they must listen to or view an advertisement. If the other call party agrees, then the process continues. If the other call party does not want to listen to the advertisement or receive the communication, then the communication may be terminated. In embodiments where advertisement(s) are played for only the calling party, when the caller has heard or viewed the advertisement(s), the communication processing system may route the communication to the other call party to complete the connection. In this embodiment, the other call party does not interact with the communication processing system or the advertisement(s).

The communications link may be established at 405 by the controlled-environment communications processing system, between the tablet computing device and the other communications device, following playing of the advertisement(s) on at least the tablet operated by the resident, and/or during play of the advertisement(s) on at least the tablet operated by the resident. The communication processing system may alert the caller that the communication is being connected prior to completing the connection. At 406, communications are carried out on the tablet, via the communications link, following playing of the at least one advertisement and/or during playing of the at least one advertisement.

After the communication connection is completed in step 405, the communication may be monitored and/or recorded, such as for improper content and/or for feedback on advertisement(s). In certain embodiments, the system plays more than one advertisement to the parties. The system may be set to play multiple advertisements or the parties may choose to increase communication time by choosing to listen to multiple advertisements. The caller may make this selection either before the communication is connected or once the communication time is expiring.

It will be understood that the term advertisement as used herein is not intended to be limited to a commercial advertisement prepared on behalf of a business organization, but includes any news, information, message, solicitation, jingle, song, lesson, prayer, public service announcement, educational program, or other information that may or may not be promoting a particular product, service, individual, organization, opinion, or philosophy. In some embodiments, the caller and/or called party advertisement may be a survey or other interactive activity in which the caller and/or called party are requested to answer questions, give opinions, or provide some other active response.

In certain embodiments, the advertisers pay for the advertisement based on the number of times the system has played the advertisement over a predetermined period. The advertisement database may track the number of times each advertisement is played over a billing period, for example. At the end of each billing cycle, the billing engine bills the advertiser based on the number of times the advertisement is played in that billing period. Alternatively, the advertiser may pay a certain fee to have the advertisement played a certain number of times during the billing period. An advertisement selection engine may then track the number of times the advertisement is broadcast and may select messages for broadcast based upon an available number of plays remaining in the billing period. For example, an advertisement that has been played a relatively fewer number of time compared to other advertisements in the database may be weighted so that it is more likely to be selected for broadcast.

In accordance with various embodiments, selected advertisement(s) are played to the respective call party and communication content may be captured for a time period following playing of the advertisement(s). In accordance with some embodiments, the resident and/or the other party to the communication may be offered an opportunity to connect to an advertiser sponsoring the advertisement. During recording of the communication, one or more questions may be posed to the resident and/or the other party to the communication, thereby recording responses or reactions of the resident and/or the other party to the communication to the one or more questions. The captured communication content from the time period following playing of the advertisement may be stored to a database. Communication content from a time period following playing of the advertisement from a plurality of calls may be aggregated and/or analyzed. Captured communication content from the time period following playing of the advertisement may be provided to an advertiser. Hence, captured communication content may be associated with a respective advertisement and stored to a database. Thereafter, stored associated captured communication content may be aggregated and analyzed. Resulting analysis of the communication content from the time period following playing of an advertisement may be applied to future selection of advertisements to play to a resident and/or selection of a same or different advertisement to play to another party to a communication.

Thus, in accordance with such embodiments, software, system or method embodiments for providing controlled-environment communication services advertisement feedback may capture communication content for a time period following playing of an advertisement presented during an audio or video communication between a resident of a controlled-environment facility and another call party. Such embodiments may pose one or more questions to the resident and/or the other call party, during recording of the communication to record responses and/or reactions to the one or more questions. Captured communication content may be associated with a respective advertisement and the resulting associated captured communication content stored to a database. The stored associated communication content from a plurality of calls may be aggregated and the aggregated communication content provided to an advertiser for analysis. The resulting analysis of the aggregated communication content may be applied to future selection of advertisements.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated that the conception and specific embodiment disclosed may be readily utilized as a basis for modifying or designing other structures for carrying out the same purposes of the present invention. It should also be realized that such equivalent constructions do not depart from the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

What is claimed is:

1. A controlled-environment facility communication system comprising:
    at least one controlled-environment facility resident operated tablet computing device in use by a resident of a controlled-environment facility within the controlled-environment facility; and
    a controlled-environment facility communication processing system comprising:
    a switch and/or router providing communication connection service between resident operated tablet computing devices and remote communications devices;
    an advertisement selection engine selecting, based upon pre-defined selection criteria, one or more pop-up advertisements to be presented to the resident on the tablet computing device and/or to another party on the remote communications device;
    a media server presenting the one or more pop-up advertisements; and
    a billing engine allowing a communication connection between the resident operated tablet computing device and the remote communications device before the one or more pop-up advertisements are displayed, after the one or more pop-up advertisements have been displayed, and/or while the one or more pop-up advertisements are being displayed.

2. The system of claim 1, wherein the pre-defined selection criteria comprise caller and/or called party characteristics.

3. The system of claim 2, wherein the selection engine selects the one or more pop-up advertisements by comparing the caller and called party characteristics.

4. The system of claim 1, wherein the pre-defined selection criteria comprise characteristics associated with each pop-up advertisement.

5. The system of claim 4, wherein the pre-defined selection criteria further comprise caller and/or called party characteristics and the selection engine selects the one or more pop-up advertisements by comparing characteristics associated with each pop-up advertisement with the caller and/or called party characteristics.

6. The system of claim 4, wherein the pre-defined selection criteria further comprise caller and/or called party characteristics, the characteristics associated with each pop-up advertisement comprise advertiser-indicated characteristics of the pop-up advertisement including business type, geographic location, and/or intended audience, and the selection engine selects the one or more pop-up advertisements by comparing characteristics associated with each pop-up advertisement with the caller and/or called party characteristics.

7. The system of claim 1, wherein the billing engine uses advertising revenue to pay for the communication and/or reduce the cost of the tablet computing device.

8. A tablet computing device implemented method comprising:
   requesting, by the tablet computing device, a communication link between the tablet computing device and another communications device;
   identifying, based on the tablet computing device being operated by the resident, a resident of a controlled-environment facility operating the tablet computing device, to a controlled-environment communications processing system;
   displaying, on the tablet computing device, at least one pop-up advertisement selected by the controlled-environment communications processing system; and
   communicating, on the tablet computing device, with the other communications device, via the communications link, before displaying of the at least one pop-up advertisement, following displaying of the at least one pop-up advertisement, and/or during displaying of the at least one pop-up advertisement.

9. The tablet computing device implemented method of claim 8, wherein the at least one pop-up advertisement selected by the controlled-environment communications processing system is selected based upon pre-defined selection criteria.

10. The tablet computing device implemented method of claim 9, wherein the pre-defined selection criteria comprise caller and/or called party characteristics.

11. The tablet computing device implemented method of claim 10, wherein the at least one pop-up advertisement selected by the controlled-environment communications processing system is selected based upon comparing the caller and called party characteristics.

12. The tablet computing device implemented method of claim 9, wherein the pre-defined selection criteria comprise characteristics associated with each pop-up advertisement.

13. The tablet computing device implemented method of claim 12, wherein the pre-defined selection criteria further comprise caller and/or called party characteristics and the controlled-environment communications processing system selects the at least one pop-up advertisement by comparing characteristics associated with each pop-up advertisement with the caller and/or called party characteristics.

14. The tablet computing device implemented method of claim 12, wherein the pre-defined selection criteria further comprise caller and/or called party characteristics and the characteristics associated with each pop-up advertisement comprise advertiser-indicated characteristics of the pop-up advertisement including business type, geographic location, and/or intended audience and the controlled-environment communications processing system selects the at least one pop-up advertisement by comparing characteristics associated with each pop-up advertisement with the caller and/or called party characteristics.

15. The tablet computing device implemented method of claim 8, further comprising using advertising revenue to pay for the communication and/or to reduce the cost of the tablet computing device.

16. A tablet computing device and controlled-environment communications processing system implemented method comprising:
   requesting, by the tablet computing device, via the controlled-environment communications processing system, a communication link between the tablet computing device and another communications device;
   identifying, based on the tablet computing device being operated by the resident, a resident of a controlled-environment facility operating the tablet computing device, to the controlled-environment communications processing system;
   selecting, by the controlled-environment communications processing system, at least one pop-up advertisement to be presented at least on the tablet computing device operated by the resident;
   displaying, at least by the tablet computing device, the at least one pop-up advertisement selected by the controlled-environment communications processing system;
   establishing the communications link, by the controlled-environment communications processing system, between the tablet computing device and the other communications device, before the displaying of the pop-up advertisement on at least the tablet computing device operated by the resident, following the displaying of the at least one pop-up advertisement on at least the tablet computing device operated by the resident, or during the displaying of the at least one pop-up advertisement on at least the tablet computing device operated by the resident; and
   communicating, on the tablet computing device, via the communications link, before displaying of the at least one pop-up advertisement, following displaying of the at least one pop-up advertisement and/or during displaying of the at least one pop-up advertisement.

17. The tablet computing device and controlled-environment communications processing system implemented method of claim 16, wherein selecting, by the controlled-environment communications processing system, at least one pop-up advertisement is based upon pre-defined selection criteria.

18. The tablet computing device and controlled-environment communications processing system implemented method of claim 17, wherein the pre-defined selection criteria comprise caller and/or called party characteristics.

19. The tablet computing device and controlled-environment communications processing system implemented method of claim 18, wherein selecting, by the controlled-environment communications processing system, at least one pop-up advertisement further comprises comparing the caller and called party characteristics.

20. The tablet computing device and controlled-environment communications processing system implemented method of claim 17, wherein the pre-defined selection criteria comprise characteristics associated with each pop-up advertisement.

21. The tablet computing device and controlled-environment communications processing system implemented method of claim 20, wherein the pre-defined selection criteria further comprise caller and/or called party characteristics and selecting, by the controlled-environment communications processing system, at least one pop-up advertisement further comprises comparing characteristics associated with each pop-up advertisement with the caller and/or called party characteristics.

22. The tablet computing device and controlled-environment communications processing system implemented method of claim 20, wherein the pre-defined selection criteria further comprise caller and/or called party characteristics, the characteristics associated with each pop-up advertisement comprise advertiser-indicated characteristics of the pop-up advertisement including business type, geographic location, and/or intended audience, and selecting, by the controlled-environment communications processing system, at least one pop-up advertisement further comprises comparing characteristics associated with each pop-up advertisement with the caller and/or called party characteristics.

23. The tablet computing device and controlled-environment communications processing system implemented method of claim 16, further comprising the controlled-environment communications processing system using advertising revenue to pay for the communication and/or to reduce the cost of the tablet computing device.

\* \* \* \* \*